US009616978B2

(12) United States Patent
Kojima

(10) Patent No.: US 9,616,978 B2
(45) Date of Patent: Apr. 11, 2017

(54) NAVIGATION ROUTE GENERATION DEVICE, AUTOMATIC STEERING SYSTEM, AND NAVIGATION ROUTE GENERATION METHOD

(71) Applicant: FURUNO ELECTRIC CO., LTD., Nishinomiya, Hyogo (JP)

(72) Inventor: Tatsuya Kojima, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 0 days.

(21) Appl. No.: 14/879,909

(22) Filed: Oct. 9, 2015

(65) Prior Publication Data

US 2016/0101838 A1 Apr. 14, 2016

(30) Foreign Application Priority Data

Oct. 14, 2014 (JP) .................. 2014-209753

(51) Int. Cl.
| | | |
|---|---|---|
| *B63B 49/00* | (2006.01) | |
| *B63H 25/04* | (2006.01) | |
| *G05D 1/02* | (2006.01) | |
| *G01C 21/20* | (2006.01) | |

(52) U.S. Cl.
CPC ............ *B63B 49/00* (2013.01); *B63H 25/04* (2013.01); *G01C 21/203* (2013.01); *G05D 1/0206* (2013.01); *Y02T 70/747* (2013.01)

(58) Field of Classification Search
CPC ..... B63B 49/00; B63B 21/16; G01C 21/3641; G01C 21/20; G01C 21/3415; G01C 21/3691; G01C 21/3694; G01S 13/931; B60W 30/10; B60K 31/0008; G05D 1/0088; G06F 3/0484; G01V 1/3808; B62D 15/0285
USPC ...... 701/21, 23, 416, 428; 342/107; 180/401
See application file for complete search history.

(56) References Cited

U.S. PATENT DOCUMENTS

| | | | | |
|---|---|---|---|---|
| 4,537,271 A | * | 8/1985 | Ito ...................... | B60K 31/0008 180/169 |
| 6,385,538 B1 | * | 5/2002 | Yokota ............... | G01C 21/3641 340/995.21 |
| 8,150,621 B1 | * | 4/2012 | Phillips ................ | G05D 1/0088 701/411 |

(Continued)

FOREIGN PATENT DOCUMENTS

JP H06-026878 A 2/1994

*Primary Examiner* — Yuri Kan
(74) *Attorney, Agent, or Firm* — Global IP Counselors, LLP

(57) ABSTRACT

There is provided a navigation route generation device with which a host moving body can be navigated by offsetting it parallel to a line on the current travel direction of the host moving body by a simple operation, without changing the preset destination or bearing. A plotter that is part of an automatic steering system of a ship comprises a current route acquisition component, a parallel route generator, and a navigation route setting component. The current route acquisition component acquires the travel direction of the host ship. The parallel route generator generates a parallel route, which is a route that is parallel to the travel direction acquired by the current route acquisition component. The navigation route setting component sets the parallel route generated by the parallel route generator to the navigation route of the host ship.

15 Claims, 9 Drawing Sheets

(56) References Cited

U.S. PATENT DOCUMENTS

| | | | |
|---|---|---|---|
| 9,120,485 B1* | 9/2015 | Dolgov | B60W 30/10 |
| 2006/0224302 A1* | 10/2006 | Kwok | G01C 21/3415 |
| | | | 701/416 |
| 2009/0015462 A1* | 1/2009 | Nakanishi | G01S 13/931 |
| | | | 342/107 |
| 2010/0204866 A1* | 8/2010 | Moshchuk | B62D 15/0285 |
| | | | 701/25 |
| 2012/0016584 A1* | 1/2012 | Nakashima | G01C 21/20 |
| | | | 701/428 |
| 2013/0087088 A1* | 4/2013 | Elmbo | B63B 21/16 |
| | | | 114/40 |
| 2014/0058671 A1* | 2/2014 | Ichikawa | G01C 21/3694 |
| | | | 701/533 |
| 2014/0269174 A1* | 9/2014 | Gagliardi | G01V 1/3808 |
| | | | 367/15 |
| 2015/0194059 A1* | 7/2015 | Starr | G06F 3/0484 |
| | | | 701/3 |
| 2016/0033298 A1* | 2/2016 | Duan | G01C 21/3691 |
| | | | 701/533 |

* cited by examiner

NAVIGATION ROUTE GENERATION DEVICE, AUTOMATIC STEERING SYSTEM, AND NAVIGATION ROUTE GENERATION METHOD

CROSS-REFERENCE TO RELATED APPLICATIONS

This application claims priority to Japanese Patent Application No. 2014-209753 filed on Oct. 14, 2014. The entire disclosure of Japanese Patent Application No. 2014-209753 is hereby incorporated herein by reference.

BACKGROUND

Field of the Invention

The present invention relates to a navigation route generation device that is mainly operated by a user to designate the navigation of a moving body.

Background Information

Automatic steering systems that perform automatic steering in a ship based on a destination or bearing set by the user have been known in the past. Examples of such an automatic steering system include one in which navigation control for navigating to a destination is performed while correcting the heading so as to head toward the set destination, and one in which course stability control is performed to automatically steer the vessel so that the course always matches the user's setting.

Japanese Laid-Open Patent Application Publication No. H6-26878 (Patent Literature 1) discloses an automatic steering system made up of a navigation device and an autopilot. In Patent Literature 1, a means is provided for registering the position of a destination by longitude and latitude data, etc., in a LORAN C or other such navigation device to set a virtual course from the current location to this destination, and then finding how much the host ship position deviates from this virtual course (the course deviation amount). Meanwhile, the autopilot device is provided with a navigation assisted steering mode in which destination bearing data and course deviation amount data are accepted from the navigation device, this destination bearing is used as the set course, course correction is performed with the course deviation data, and steering is performed so that the vessel proceeds along the set course.

SUMMARY

However, when a vessel is automatically steered as discussed above, there are times when the user wants the host ship to temporarily deviate from the current navigation route. As shown in FIG. 6, for example, when passing through a narrow passage (such as a strait or between bridge supports, if the route over which the host ship is actually travelling (a route on the travel direction line; hereinafter referred to as the current route) differs for some reason from the route intended by the navigator, and may approach too close to a bridge support or a pier, the route of the vessel must be adjusted. Also, as shown in FIG. 7, even if the vessel is navigating along the route intended by the navigator, if some other vessel should appear dead ahead, for example, the route of the host ship will again have to be adjusted so that the vessel will pass by the other vessel at a safe distance.

A new navigation route in which a vessel is supposed to travel can be set in many different ways in the above situations, and one of these is to set the new route so that it parallel deviates from the navigation route currently being traveled. An advantage to this approach is that the relation between the new route and the initial route is easy grasp intuitively, and it tends not to affect the original navigation plan.

However, when a vessel was to be changed to follow a parallel route from its initial route with a conventional automatic steering system, this required the following complicated operation.

Specifically, when the user wants to change the navigation route of the vessel to a parallel route during automatic navigation under navigation control, a plotter or other such navigation route generation device must be used to set two or more new destinations. Specifically, as shown in FIG. 8, two points D1 and D2 that lie along the new route that is offset parallel to the current route are set as intermediate destinations, and once the vessel reaches first the point D1 and then the point D2, the route has to be reset and automatic steering engaged so that the original destination will be reached. Thus, the user had to perform a complicated operation just to offset the navigation route.

When the user wants to offset the route of the vessel to be parallel to the navigation route during automatic navigation under course stability control, as shown in FIG. 9, an instruction to change the course of the vessel must be given at two points P1 and P2. To describe this more specifically, after the user issues a command to change the course at the point P1, the vessel position is continued to be monitored, and at the point when the vessel has approximately reached the new route that parallel deviates from the current route (when the point P2 is reached), a command is given to restore the course of the vessel to its original course. That is, when the vessel is moved to the new route, the user has to concentrate and continue to monitor the vessel position while the vessel is navigating from the point P1 to the point P2 shown in FIG. 7, and this places a considerable burden on the user.

With the automatic steering system disclosed in Patent Literature 1, when the user wants the vessel to deviate parallel to the navigation route, first the target bearing of the vessel is changed so that the vessel goes from its current position to the targeted new route. Then, the automatic steering system sets a virtual route based on the target bearing set by the user, and the vessel navigates along this virtual route. Once the vessel reaches the targeted new route, the user again changes the target bearing of the vessel so that it navigates to a point farther along the new route. After this, the automatic steering system sets the virtual route of the vessel based on the new target bearing. Thus, when the user wants to change the navigation route of the vessel to a parallel route, with the automatic steering system in Patent Literature 1, the target bearing of the vessel has to be changed twice, and the user must monitor the situation until the targeted new route is reached, and this places a considerable burden on the user.

The present invention was conceived in light of the above situation, and it is an object thereof to provide a navigation route generation device with which a host moving body can be easily changed from a line on its current travel direction to a parallel route, without changing the preset destination or course.

The problem to be solved by the present invention is as given above, and the means for solving this problem will now be described along with the effect of the means.

A first aspect of the present invention provides a navigation route generation device with the following configuration. Specifically, this navigation route generation device comprises a travel direction acquisition component, a parallel route generator, and a navigation route setting component. The travel direction acquisition component acquires a travel direction of a host moving body. The parallel route generator generates a parallel route, which is a route parallel to the travel direction acquired by the travel direction acquisition component. The navigation route setting component sets the parallel route generated by the parallel route generator to be a navigation route of the host moving body.

Consequently, a new route that is parallel to a current travel direction of the host moving body can be easily designated. Therefore, when necessary, the navigation route of the host moving body can be easily and flexibly changed to a new route that is parallel to the travel direction.

With the above navigation route generation device, it is preferable if the travel direction is a current travel direction of the host moving body.

This makes it easy to generate a new route that is parallel to the current travel direction of the host moving body.

The above navigation route generation device is preferably configured as follows. Specifically, this navigation route generation device comprises a host moving body position acquisition component. The host moving body position acquisition component acquires a host moving body position. A direction acquired by the travel direction acquisition component is the travel direction based on the host moving body position with respect to a nearest waypoint.

Consequently, a parallel route can be suitably established based on the travel direction of the host moving body that has been set.

With the above navigation route generation device, it is preferable if a direction acquired by the travel direction acquisition component is the travel direction at an arbitrary point along a route set based on a navigation plan.

Consequently, a parallel route can be suitably established based on the route set according to a navigation plan.

The above navigation route generation device is preferably configured as follows. Specifically, this navigation route generation device comprises a distance setting component for setting a distance between the host moving body and the parallel route. The parallel route generator generates a parallel route based on the distance.

Consequently, the user can issue a command to assume the desired new route by a simple operation of designating the distance of the parallel route with respect to the host moving body.

The above navigation route generation device is preferably configured as follows. Specifically, this navigation route generation device comprises a disposition setting component for setting whether a disposition of the parallel route with respect to the travel direction is on the right side or the left side with respect to the travel direction. The parallel route generator generates the parallel route based on the disposition of the parallel route.

Consequently, the user can issue a command to assume the desired new route by a simple operation of designating the offset direction (right side or left side) with respect to the host moving body.

The above navigation route generation device is preferably configured as follows. Specifically, this navigation route generation device comprises a point setting component for setting an arbitrary point that has deviated to the right side or the left side with respect to the travel direction. The parallel route generator generates the parallel route including the point.

Consequently, the user can issue a command to assume the desired new route by an intuitive operation of merely designating a single point included in the new route.

The above navigation route generation device preferably further comprises a display component for displaying a parallel route generated by the parallel route generator.

Consequently, the user can properly confirm a change in the navigation route of the host moving body.

The above navigation route generation device is preferably configured as follows. Specifically, this navigation route generation device comprises an obstacle detector and a notification component. The obstacle detector detects an obstacle that lies on a line along the travel direction. The notification component notifies a user when an obstacle has been detected by the obstacle detector.

Consequently, the user can be advised that there is a high probability of collision with an obstacle, and thereby prompted to perform an avoidance maneuver including a change of the navigation route to a new route.

With the above navigation route generation device, it is preferable if the notification component notifies the user of an option of the parallel route that avoids the obstacle detected by the obstacle detector.

Consequently, a parallel route for avoiding an obstacle can be generated very simply.

The above navigation route generation device preferably further comprises a parallel route cancellation component for issuing a command to return from the parallel route to a route on a line in the direction of travel prior to the generation of the parallel route.

Consequently, the operation for returning from the new route to the original route can also be carried out simply, so temporary changes in the navigation route can be made more flexibly.

The above navigation route generation device preferably further comprises a route transition setting component for setting a route transition parameter, including one or more of a transition route, speed during transition, transition duration, and steering angle, up until the host moving body reaches the parallel route from the position of the host moving body.

Consequently, the optimal movement speed and steering angle or route can be easily set based on the current position of the host moving body, the situation surrounding the vessel, and so forth. Therefore, the navigation route of the host moving body can be favorably changed to a new route.

The above navigation route generation device is preferably configured as follows. Specifically, this navigation route generation device comprises a graph display component and a graph movement component. The graph display component displays on the display component a graph indicating a current travel direction of the host moving body. The graph movement component moves the graph displayed on the display component parallel. The parallel route generator generates the parallel route on the moved graph or on an extension line of the graph.

Consequently, the user can select a new route by an intuitive operation of moving the graph parallel.

The above navigation route generation device is preferably configured as follows. Specifically, this navigation route generation device preferably further comprises a touch panel that senses touch operation. The graph movement component moves the graph parallel according to the touch operation.

Consequently, the operation can be made more intuitive.

The above navigation route generation device is preferably configured as follows. Specifically, this navigation route generation device further comprises a dial-type input component that senses an amount of rotation. The graph movement component moves the graph parallel according to the amount of rotation.

Consequently, parallel movement can be properly performed via a dial-type input component.

A second aspect of the present invention provides an automatic steering system with the following configuration. Specifically, this automatic steering system comprises the above-mentioned navigation route generation device and an automatic steering device for automatically steering the host moving body. The automatic steering device performs steering according to the parallel route generated by the navigation route generation device.

Consequently, an automatic steering system can be provided with which it is easy to change a navigation route to a parallel route.

A third aspect of the present invention provides a navigation route generation method with the following configuration. Specifically, this navigation route generation method includes a travel direction acquisition step, a parallel route generation step, and a navigation route setting step. In the travel direction acquisition step, a travel direction of a host moving body is acquired. In the parallel route generation step, a parallel route is generated with respect to the travel direction acquired by the travel direction acquisition step. In the navigation route setting step, the parallel route generated in the parallel route generation step is set to be a navigation route of the host moving body.

Consequently, the user can easily select a new route parallel to the current travel direction of the host moving body. Therefore, if necessary, the navigation route of the host moving body can be easily and flexibly changed to a new route parallel to the travel direction.

The above navigation route generation method preferably includes a host moving body position acquisition step of acquiring a host moving body position. A direction acquired in the travel direction acquisition step is the travel direction based on the host moving body position acquired in the host moving body position acquisition step with respect to a nearest waypoint.

Consequently, a parallel route can be properly established based on the travel direction of the host moving body that has been set.

With the above navigation route generation method, it is preferable if a direction acquired in the travel direction acquisition step is the travel direction at an arbitrary point along a route set based on a navigation plan.

Consequently, a parallel route can be properly established based on a route that has been set according to a navigation plan.

BRIEF DESCRIPTION OF THE DRAWINGS

Referring now to the attached drawings which form a part of this original disclosure.

DETAILED DESCRIPTION OF EMBODIMENTS

Figure 1:
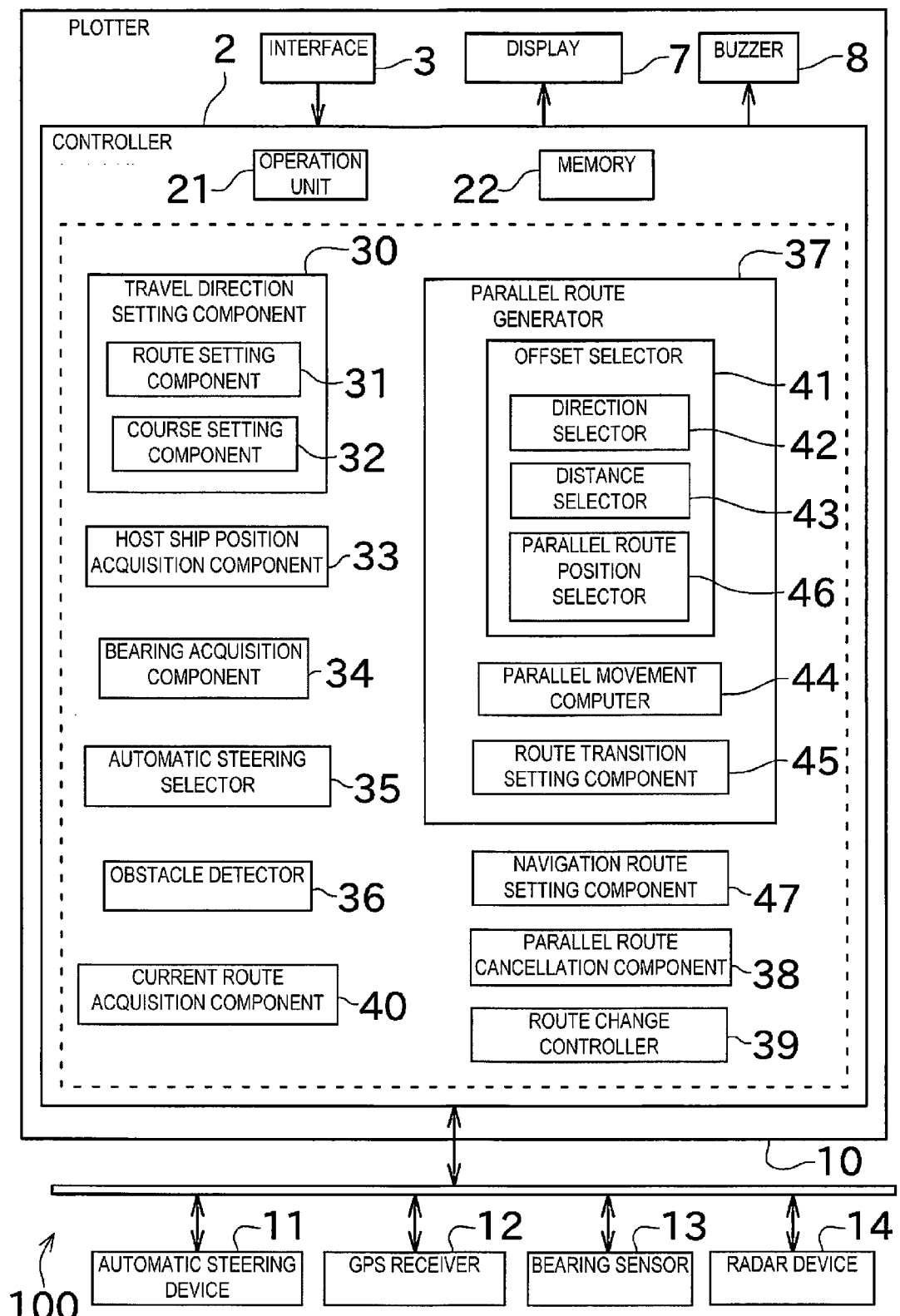
FIG. 1 is a block diagram of the configuration of a plotter and automatic steering system pertaining to an embodiment of the present invention.

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents. FIG. 1 is a block diagram of the configuration of a plotter 10 and an automatic steering system 100 pertaining to an embodiment of the present invention.

The plotter 10 (navigation route generation device) pertaining to this embodiment is a device that is installed in a ship (moving body) and can plot and display a track by acquiring the position of the host ship. This plotter 10 is installed in the helm of the vessel. The user (helmsman, operator) can issue commands related to navigation of the ship by operating this plotter 10. For instance, the user can operate the plotter 10 to select automatic navigation using an automatic steering device 11 (discussed below) according to the planned navigation route/course of the vessel.

The automatic steering system 100 in this embodiment is configured to include the plotter 10 and the automatic steering device 11. The configuration of the automatic steering system 100 will now be described.

As shown in FIG. 1, the automatic steering system 100 comprises the above-mentioned plotter 10, the automatic steering device 11, a GPS receiver 12, a bearing sensor 13, and a radar device 14. These devices are connected via an onboard LAN or other such suitable network, for example, and can exchange various kinds of data with each other.

The automatic steering device 11 will not be described in detail, but is configured to comprise a cylinder for driving the rudder of the ship, a pump for supplying hydraulic fluid to the cylinder, a valve for switching the flow of the hydraulic fluid, a valve controller for controlling the opening and closing of the valve, a sensor for sensing the rudder angle, and so on. The automatic steering device 11 controls the opening and closing of the above-mentioned valve based on information about the heading and position of the host ship inputted from the GPS receiver 12 and the bearing sensor 13, which allows the rudder to be operated automatically so that the vessel can be operated according to a navigation route or course set on the plotter 10.

The GPS receiver 12 senses the current position of the ship by receiving a positioning signal from a GPS antenna (not shown). The information about the position of the ship sensed by the GPS receiver 12 is outputted to the plotter 10 and the automatic steering device 11.

The bearing sensor 13 is configured as a satellite compass equipped with a plurality of GPS antennas fixed to the ship, and can measure the heading of the ship from the relative relation of the ship positions sensed by these GPS antennas. The heading information sensed by the bearing sensor 13 is sent to the plotter 10 and the automatic steering device 11. In addition to the configuration discussed above, the bearing sensor 13 can also be a magnetic bearing sensor, a gyro compass, or the like.

The radar device 14 sends and receives radio waves via a radar antenna (not shown), and can produce a radar image that depicts objects around the ship. The radar image produced by the radar device 14 is outputted to the plotter 10.

The plotter 10 mainly comprises an interface (input component) 3, a display (display component, notification component) 7, a buzzer (notification component) 8, and a controller 2.

The interface 3 is, for example, a key, a switch, a pointing device, a touch panel, a dial-type input component, or the like. The user can operate this interface 3 to input various commands to the plotter 10 (the controller 2).

The display 7 is configured as a liquid crystal display, for example, and can graphically display various information under the control of the controller 2. For instance, the display 7 displays an electronic sea chart stored in a memory 22, and the current position of the ship, a preset scheduled route, the track of the ship so far, and so forth are displayed as an overlay over this electronic chart. The user can look at this screen display and clearly grasp the current position of the ship, the future route, and so on.

The buzzer 8 is configured to emit a sound in response to a signal from the controller 2 when various kinds of situation that demand attention (such as when the position of the ship greatly deviates for some reason from the scheduled route that was set in advance) are detected. This brings the user's attention to things as needed.

The controller 2 comprises an operation unit 21 consisting of a CPU, and a memory 22 consisting of a ROM, RAM, etc. In the ROM of the memory 22 are stored various kinds of program, such as a chart display program, a route setting program, an automatic steering program, and a route changing program.

With the plotter 10 in this embodiment, cooperation between the hardware and software described above allows the controller 2 to operate as a travel direction setting component 30, a host ship position acquisition component (position acquisition component) 33, a bearing acquisition component 34, an automatic steering selector 35, an obstacle detector 36, a current route acquisition component (travel direction acquisition component) 40, a parallel route generator 37, a navigation route setting component 47, a parallel route cancellation component 38, a route change controller 39, and so forth.

In addition to the above-mentioned programs, the memory 22 provided to the controller 2 also stores electronic chart data, various parameters set by the user, and so forth.

The travel direction setting component 30 comprises a route setting component 31 and a course setting component 32, and can be operated by the user to set the travel direction of the ship.

The route setting component 31 has the function of allowing the user to set a route for conducting the ship from one point to another point (hereinafter also referred to as the scheduled route). Specifically, the user can use the route setting component 31 to set a scheduled route based on a navigation plan. With the plotter 10 in this embodiment, this scheduled route can be set graphically. More specifically, in a state in which an electronic chart and the current position of the ship are displayed on the display 7, the user can designate a point that is the (final) destination of the ship and a point that the ship is supposed to have passed by registering points (waypoints) on the electronic chart by operating the interface 3. Consequently, the scheduled route is set by linking these points designated by the user. The scheduled route that has been set is stored in the memory 22.

The user then operates the interface 3 as needed to designate automatic steering based on the above-mentioned scheduled route, allowing automatic navigation so that the ship reaches its final destination along the scheduled route (this is the navigation control mentioned above).

The course setting component 32 has the function of allowing the user to set a course (bearing) in which the ship is to head. This course (sometimes also called a scheduled course herein) can also be designed graphically, just as discussed above, when the user designates points on the electronic chart by operating the interface 3 in a state in which the electronic chart and the current position of the ship are displayed on the display 7. The scheduled course that has been set is stored in the memory 22.

The use then operates the interface 3 as needed to designate automatic steering based on the above-mentioned scheduled course, allowing automatic navigation so that the course of the ship will match the scheduled course (this is the course stability control mentioned above).

The host ship position acquisition component 33 acquires the position of the ship by analyzing information about the position of the ship inputted from the GPS receiver 12.

The bearing acquisition component 34 acquires the heading of the ship by analyzing heading information inputted from the bearing sensor 13.

The automatic steering selector 35 performs automatic steering by outputting a suitable steering command to the automatic steering device 11 based on the course set with the course setting component 32, or the scheduled route set with the route setting component 31, based on a command from the user. This allows automatic steering to be performed based on the above-mentioned navigation control or course stability control.

The obstacle detector 36 determines whether or not there is an obstacle with which the ship may collide in the future by analyzing the radar image obtained from the radar device 14. This determined is performed, for example, based on whether or not an object has been detected on the scheduled route of the ship set by the user, or whether or not an object has been detected on a route pulled from the current ship's position toward the scheduled course that has been set.

The controller 2 in this embodiment tells the buzzer 8 to emit a sound when it has been determined by the obstacle detector 36 that there is an obstacle with which the ship may collide, and prompts the user to perform an avoidance maneuver that includes the route deviation discussed below. This allows the user to further properly perform the navigation.

The current route acquisition component 40 acquires the current route of the ship (or, the travel direction of the ship) that will serve as a reference for the route deviation discussed below, by one of the methods discussed below.

The parallel route generator 37 has the function of generating a parallel route as needed in order to help the user issue a command to cause the vessel to navigate a route (new route, second route) that is parallel to and offset from the route currently being navigated (current route) when the above-mentioned automatic navigation is being performed. To achieve this function, the parallel route generator 37 comprises an offset selector 41 and a parallel movement computer 44.

The parallel movement computer 44 computes (generates) a new route that will be offset parallel to the current route based on a user command inputted via the offset selector 41.

The "current route" that serves as a reference in this computation is the one acquired by the current route acquisition component 40, and means the route that the vessel is currently navigating. This can be established by various specific methods as discussed below, and the method that is best suited can be employed.

More specifically, when a scheduled route is set with the route setting component 31 and automatic navigation is performed (in the case of navigation control), the following three methods, for example, are possible ways to establish the current route. The first is a method in which the scheduled route set with the route setting component 31 is used directly as the above-mentioned current route. The second is a method in which a route that passes through the actual position of the ship acquired at the point of user operation, and that faces in the same direction as the scheduled route is used as the current route. The third is a method in which the nearest passed route of the ship is found from the actual position of the ship acquired at the point of user operation and the actual position of the ship acquired in the past, regardless of the scheduled route, and a suitable extension of this passed route is used as the current route.

Also, when automatic navigation is performed by setting the scheduled course with the course setting component 32 (in the case of course stability control), the following two methods, for example, are possible ways to establish the current route. The first is a method in which a route that passes through the actual position of the ship acquired at the point of user operation, and that faces in the same direction as the scheduled course is used as the current route. The second is a method in which the nearest passed route of the ship is found from the actual position of the ship acquired at the point of user operation and the actual position of the ship acquired in the past, regardless of the scheduled course, and a suitable extension of this passed route is used as the current route.

Therefore, the current route acquisition component 40 can acquire the above-mentioned current route from one or more of the route setting component 31, the course setting component 32, and the host ship position acquisition component 33. The parallel route generator 37 computes a new route based on the current route thus obtained (the travel direction of the ship).

If the user wants to offset the route of the ship to a parallel position when automatic navigation is being performed, he operates the interface 3 of the plotter 10 and selects "route offset" from the menu displayed on the display 7, for example. The controller 2 then displays the above-mentioned current route and the position of the ship as an overlay over the electronic chart, and has the user select how much the route is to be offset and in which direction from the current route (in other words, how much the new route is to be offset and in which direction from the current route).

To achieve this function, the offset selector 41 comprises a direction selector (disposition setting component) 42 and a distance selector (distance setting component) 43. The direction selector 42 allows the user to select whether to offset the new route to the right or to the left from the current route (that is, the offset direction). The distance selector 43 allows the user to select how far the new route is to be offset from the current position of the ship (or the current route of the ship) (that is, the offset distance).

Figure 2:
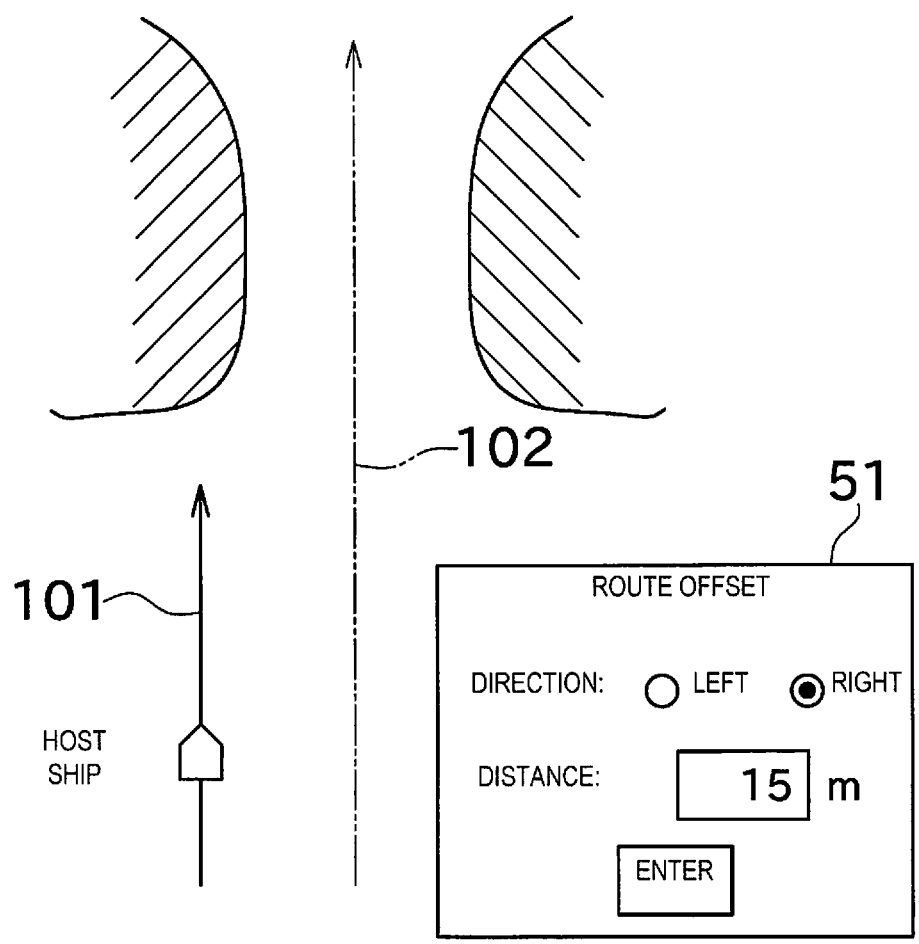
FIG. 2 is a diagram illustrating an example of an operation for using a window to designate the offset direction and offset distance for offsetting the navigation route of the host ship.

There are various ways by which the offset selector 41 allows the user to specifically select the offset direction and distance. For instance, as shown in FIG. 2, the offset direction may be selected from right and left, and a window 51 for selecting the offset distance numerically may be displayed on the display 7 so that the user can make the appropriate selection with the interface 3.

Figure 3:
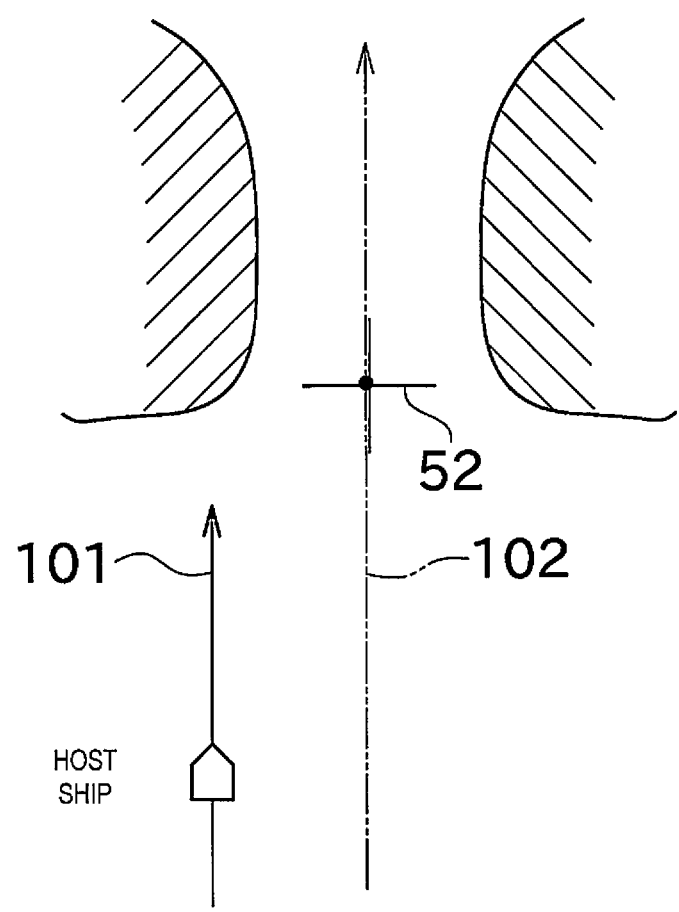
FIG. 3 is a diagram illustrating an example of an operation for using a point to designate the offset direction and offset distance.

Also, to allow route offset to be selected more intuitively, the offset selector 41 comprises a parallel route position selector 46. As shown in FIG. 3, this parallel route position selector 46 is configured so that the offset direction and the offset distance of a new route 102 can be selected at the same time by using a cursor 52 to select the desired point away from the current route 101, in a state in which the ship's position and the current route 101 are displayed as an overlay on the electronic chart.

However, the configuration may be such that instead of selecting the desired point with the cursor 52, a graph indicating the current route 101 of the ship (such as a straight line extending from the ship in the same direction as the current route 101 in FIG. 3) is displayed on the display 7, this graph is moved parallel by dragging it with a pointing device (the interface 3), and thereby simultaneously selecting the offset direction and the offset distance of the new route 102. The above configuration can be realized by having the parallel route generator 37 (the offset selector 41) comprise a graph display component for displaying a graph on the display 7 as discussed above, and a parallel movement component for the parallel movement of the graph displayed on the display 7 (neither of these is depicted in the drawings), and having the parallel route generator 37 generate a parallel route on the graph, or an extension thereof, after this parallel movement. The above-mentioned parallel movement may be accomplished by dragging on a touch panel, or by turning a dial-type input component to the right or left. The above allows the user to select the new route 102 more intuitively.

Also, the configuration may be such that when the user selects the offset direction or offset distance, a radar image acquired by the radar device 14 is displayed as an overlay over the electronic chart. In this case, the user can precisely specify the offset direction and offset distance of the new route 102 while referring to the size and bearing of an object or obstacle detected by the radar device 14.

The configuration is not limited to when the user selects a parallel route manually, and with the plotter 10 in this embodiment, one or more options for a parallel route may be computed and displayed on the display 7, and a parallel route can be set by the user by selecting one of these options. This parallel route setting assist function affords simpler navigation.

The parallel route options are preferably set as follows, for example, so that an obstacle can be avoided. Specifically, when the obstacle detector 36 has detected an obstacle on the current route of the ship, the controller 2 causes the buzzer 8 to emit a sound, and parallel route options that will allow the detected obstacle to be avoided are displayed on the display 7 based on the ship position acquired from the host ship position acquisition component 33 and the position where the obstacle is located, thereby alerting the user.

The parallel movement computer 44 computes the new route 102 by performing computation in which the current route 101 is moved parallel based on the offset direction and offset distance selected with the offset selector 41. The specific computation method here will not be described, but the computation of the new route 102 can be accomplished by a known geometric relation.

Figure 4:
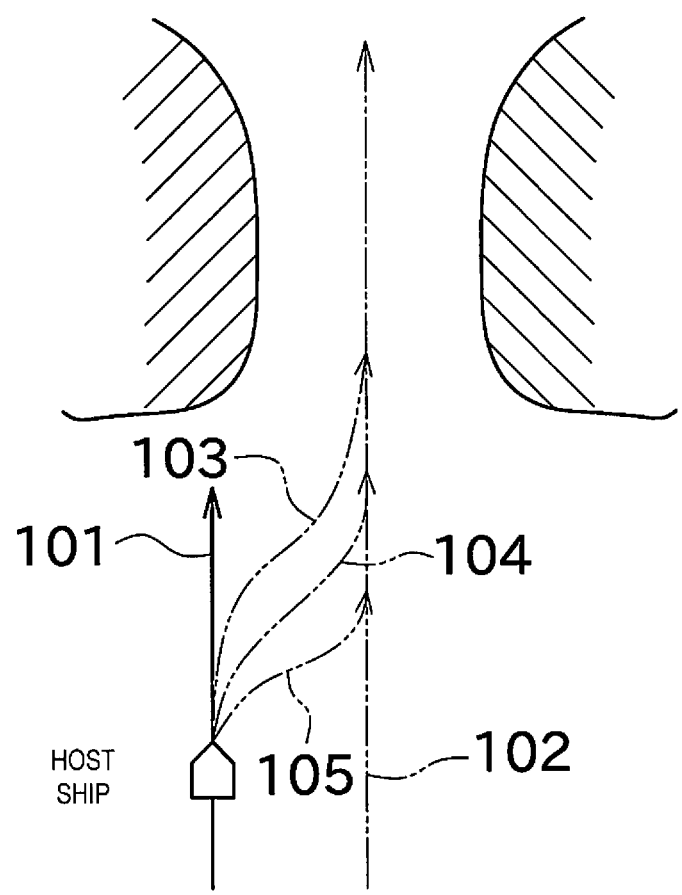
FIG. 4 shows three examples of a transition route, in which the host ship transitions from its current route to a new route.
Figure 5:
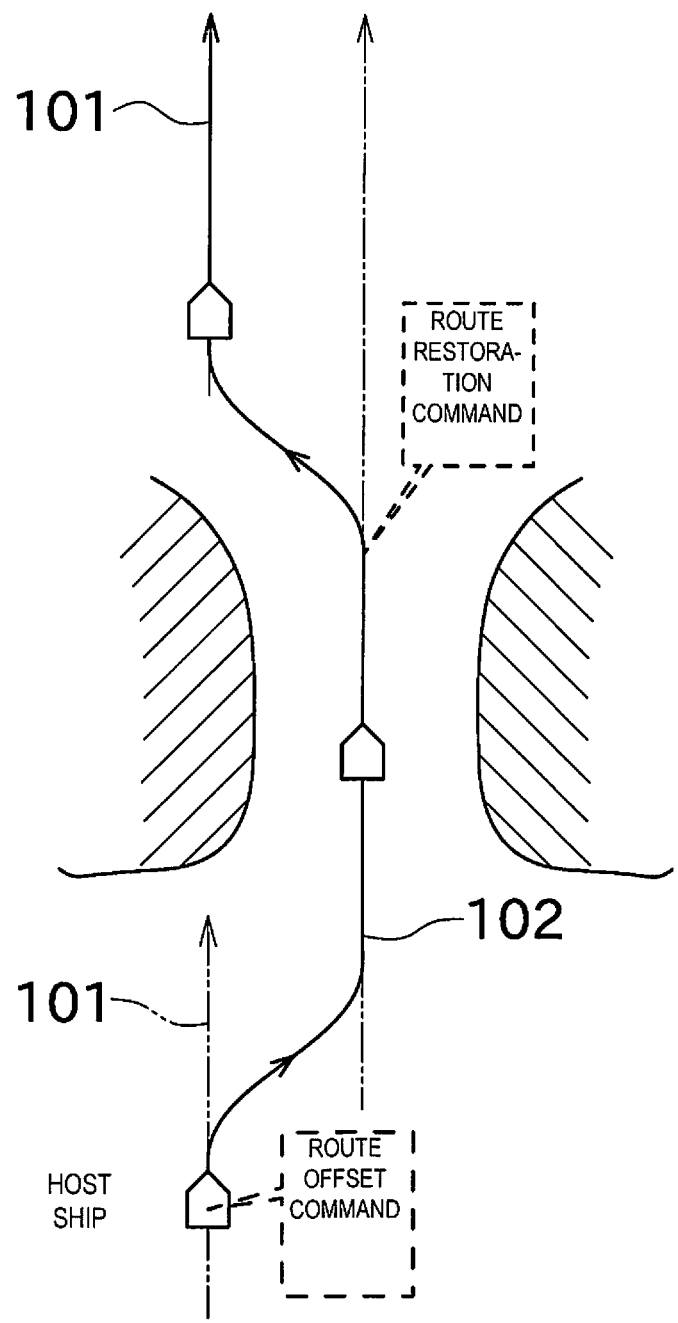
FIG. 5 is a diagram illustrating when the host ship makes a transition from its navigation route to a new route, and then returns to the original route.
Figure 6:
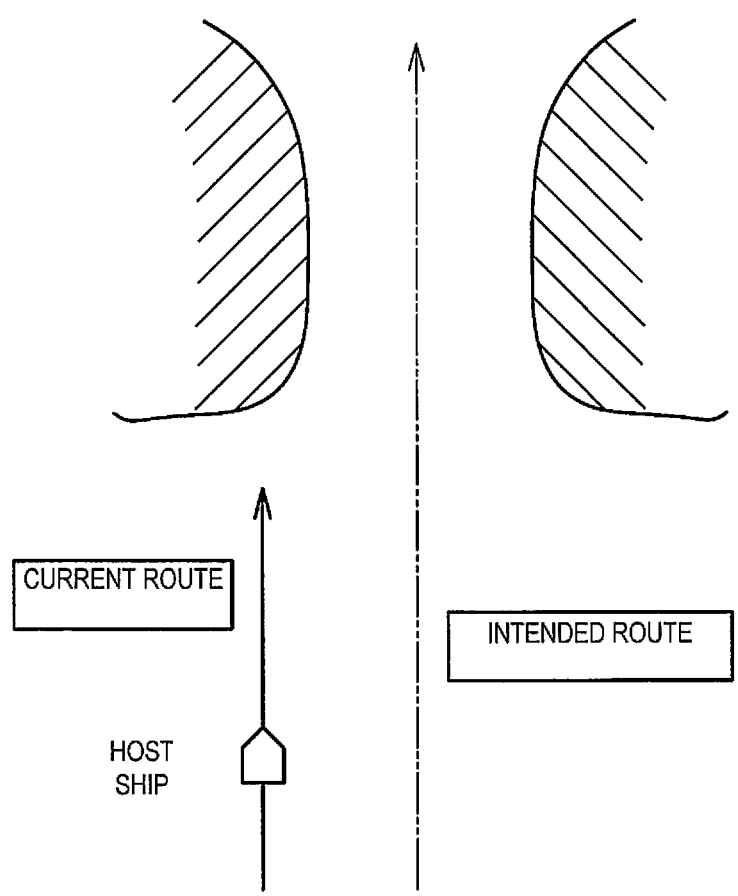
FIG. 6 shows an example of when route movement is necessary during the navigation of a ship.
Figure 7:
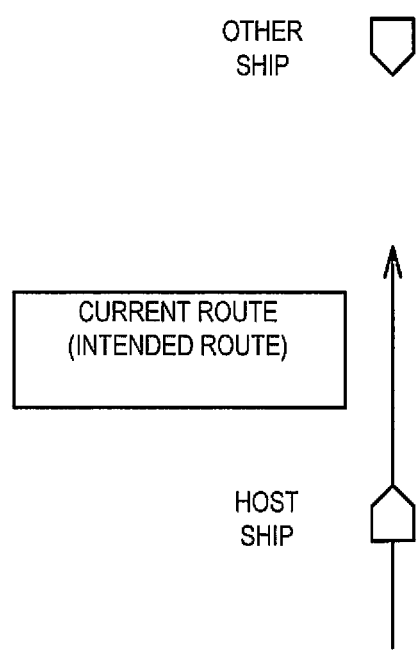
FIG. 7 shows another example of when route movement is necessary during the navigation of a ship.
Figure 8:
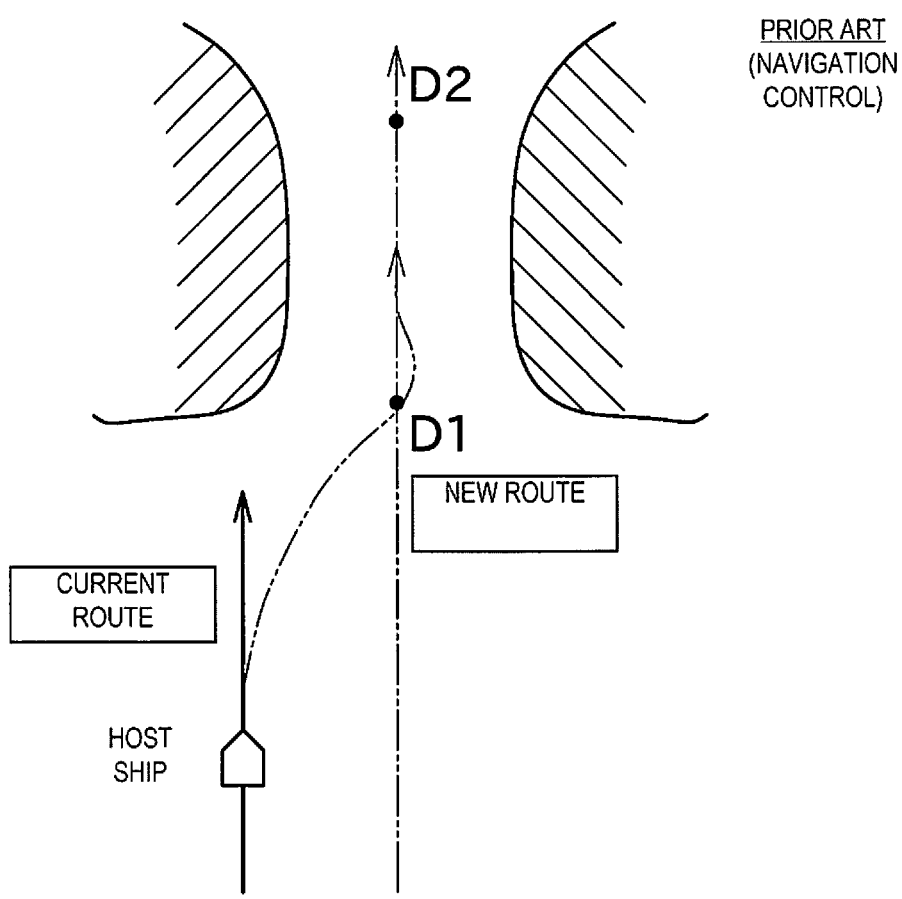
FIG. 8 is a diagram illustrating a conventional operation when the navigation route is moved to a parallel position in a ship that performs automatic navigation under navigation control.
Figure 9:
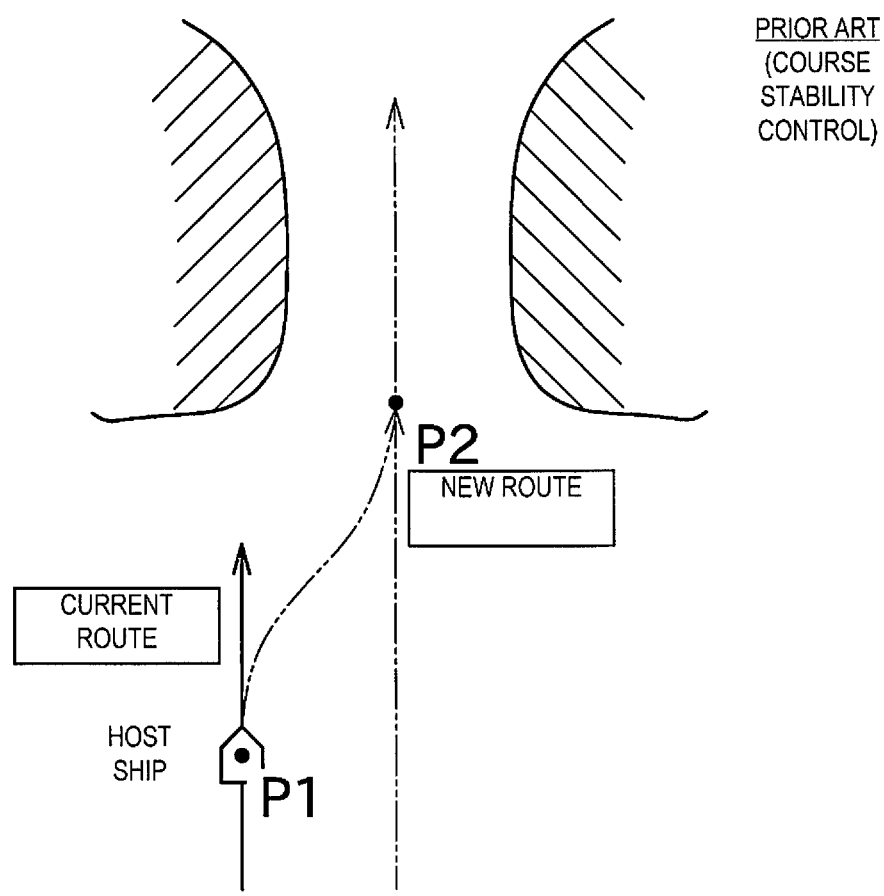
FIG. 9 is a diagram illustrating a conventional operation when the navigation route is moved to a parallel position in a ship that performs automatic navigation under course stability control.

The parallel route generator 37 also comprises a route transition setting component 45 with which the user can select how the ship will be turned into the new route 102. The route transition setting component 45 allows the user to select the path over which the ship will transition from the current position (the current route 101) to the new route 102 (that is, the transition route), the ship speed during transition, and so forth. Consequently, the ship can change over to the new route at the proper speed and along the proper transition route that best suit the situation, such as when a gentle transition that gives priority to comfort is preferred, or when the transition must be made quickly in order to avoid an obstacle. FIG. 4 shows an example of a gentle transition route 103, a sudden transition route 105, and an intermediate transition route 104.

The route transition setting component 45 may also be configured such that the steering angle or the like during route transition is set, instead of setting the transition route as above. Also, how long the transition to the new route 102 is to last may be set instead of setting the ship speed during transition.

The route transition setting component 45 may also be configured such that a plurality of combinations of transition route, ship speed during transition, and other such settings are preset in advance, and the user can select one of these preset settings. An example of these preset settings is to use three levels of gentle, intermediate, and quick according to the urgency of the route offset. In the case of "gentle," the transition route is a gentle one, and the ship speed is set low. In the case of "quick," the transition route is very sharp and the ship speed is set high. In the case of "intermediate," the transition route and the ship speed are both set to be in the approximate middle between "gentle" and "quick." This affords more convenient operation.

The navigation route setting component 47 sets the new route 102 generated by the parallel route generator 37 to the navigation route of the ship.

The parallel route cancellation component 38 is used to end the route offset performed by the parallel route generator 37 and the navigation route setting component 47, and to restore the navigation route of the ship to the original route (the current route). The parallel route cancellation component 38 will be discussed in detail below.

When the route is offset by the parallel route generator 37 and the navigation route setting component 47, the route change controller 39 performs control so that the new route 102 (that is, the route of the ship set with the navigation route setting component 47) is displayed on the display 7. The selected transition route may also be displayed at this time.

Also, the route change controller 39 outputs an appropriate signal to the automatic steering selector 35 so that the ship will navigate the new route 102 (via the transition route) based on the details of the route offset performed by the parallel route generator 37 and the navigation route setting component 47. Consequently, the automatic steering selector 35 outputs a control signal to the automatic steering device 11, and the ship is made to navigate according to the transition route and the new route 102.

With the above configuration, the plotter 10 in this embodiment allows the user to issue a command for the automatic navigation of the ship according to a scheduled route or scheduled course that was set ahead of time. Also, when the plotter 10 is performing the above-mentioned automatic navigation, the user can easily issue a command to navigate the ship along the new route 102 computed so as to be parallel to the current route 101 over which the ship is currently navigating.

Also, with the plotter 10 in this embodiment, the parallel route generator 37 and the navigation route setting component 47 are provided independently of the route setting component 31 and the course setting component 32. Therefore, performing route offset with the parallel route generator 37 and the navigation route setting component 47 will not affect the scheduled route set with the route setting component 31 or the scheduled course set with the course setting component 32. Therefore, the user can return the ship to its original state prior to offsetting of the route (that is, to the current route 101 prior to parallel movement) by issuing a command at the desired timing (via the parallel route cancellation component 38). As a result, a command to offset the route and a command to return to the original route can both be issued very simply, so the automatic steering system 100 can be provided which is easy to use and is very flexible, and with which ease of operation is greatly enhanced when it comes to temporarily offsetting the navigation route.

A specific example of when the user restores the route using the parallel route cancellation component 38 is when the user selects "restore route" from a menu or the like. In this case, the route change controller 39 immediately outputs to the automatic steering selector 35 a signal to the effect that the route is to be restored to the original route, and the automatic steering selector 35 controls the automatic steering device 11 so that the ship will navigate along the original route.

However, instead of a command to immediately restore the route to the original route, the parallel route cancellation component 38 can also issue a command for the route to be automatically restored when a specified condition is met in the future (conditional route restoration). Examples of conditions for restoring the route include when the ship has navigated for a specific length of time along the new route 102, when it has navigated a specific distance, and when the ship has reached a point specified by the user on the new route 102, although other conditions are also possible. The selection of this conditional route restoration can be done simultaneously with the selection of route offsetting, or can be done after the selection of route offsetting. Consequently, the ship can be returned to its original navigation route and resume navigation at a suitable timing, without increasing the monitoring burden on the user.

As described above, the plotter 10 in this embodiment comprises the current route acquisition component 40, the parallel route generator 37, and the navigation route setting component 47. The current route acquisition component 40 acquires the travel direction of the ship. The parallel route generator 37 generates a route that is parallel to the travel direction acquired by the current route acquisition component 40. The navigation route setting component 47 sets the parallel route generated by the parallel route generator 37 to be the navigation route of the ship.

Consequently, a new route 102 that is parallel to the current travel direction of the ship can be easily selected, and when passing through a narrow channel or between bridge supports, when passing near another ship, or in other such situations, the navigation route of the ship can be easily and flexibly changed to the new route 102 that is parallel to the current route 101.

A preferred embodiment of the present invention was described above, but the above configuration can be modified as follows, for example.

The selection of the offset direction or offset amount of the new route 102 with respect to the current route 101 is not limited to being performed on the display screen of the display 7. For instance, selection can be made without the display 7 by using a method in which the above-mentioned dial-type input component is operated, and the route is offset 5 meters to the left if the dial is turned one stage to the left from its neutral position, and the route is offset 5 meters to the right if the dial is turned one stage to the right.

The parallel route cancellation component 38 may also comprise the same configuration as the above-mentioned route transition setting component 45, and the configuration may be such that the transition route, the ship speed during transition, and so forth can be selected even when the user issues a command to restore the route.

The parallel route cancellation component 38 may be omitted. Here again, the parallel route generator 37 and the navigation route setting component 47 can be used to substantially restore the route of the host ship to its original route by using the plotter 10 to offset again from the new route 102 by an equal distance to the opposite side.

The navigation route generation device is not limited to being configured as the plotter 10 given in the above embodiment, and can also be configured as a multi-function display that is capable of displaying various kinds of information together.

The parallel route generator 37, the navigation route setting component 47, the parallel route cancellation component 38, the route change controller 39, and so forth may also be provided on the automatic steering device 11 side, rather than to the plotter 10. For example, since the automatic steering device 11 usually performs course settings and the like, it is equipped with a display, an interface, and so on. Therefore, the navigation route generation device of the present invention can be applied to this interface, and the configuration can be such that the user selects the above-mentioned route offset by operating this interface.

The navigation route generation device and automatic steering system of the present invention can also be applied to a moving body other than a ship.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A navigation route generation device, comprising:
a controller, configured to acquire a travel direction of a host moving body, generate a parallel route, which is a route parallel to the travel direction, set the parallel route as a navigation route of the host moving body, set whether a disposition of the parallel route with respect to the travel direction is on the right side or the left side with respect to the travel direction, and generate the parallel route based on the disposition of the parallel route.

2. The navigation route generation device according to claim 1, wherein
the travel direction is a current travel direction of the host moving body.

3. The navigation route generation device according to claim 1, wherein
the controller is further configured to acquire a host moving body position,
wherein a direction acquired by the controller is the travel direction based on the host moving body position acquired by the controller with respect to a nearest waypoint.

4. The navigation route generation device according to claim 1, wherein
a direction acquired by the controller is the travel direction at an arbitrary point along a route set based on a navigation plan.

5. The navigation route generation device according to claim 1, wherein
the controller is further configured to set a distance between the host moving body and the parallel route, and generate a parallel route based on the distance.

6. The navigation route generation device according to claim 1, wherein the controller is further configured to set an arbitrary point that has deviated to the right side or the left side with respect to the travel direction, and generate the parallel route including the arbitrary point.

7. The navigation route generation device according to claim 1, wherein
the controller is further configured to control a display to display a parallel route generated by the controller.

8. The navigation route generation device according to claim 1, wherein
the controller is further configured to detect an obstacle that lies on a line along the travel direction and notify a user when an obstacle has been detected.

9. The navigation route generation device according to claim 8, wherein
the controller is further configured to notify the user of an option of the parallel route that avoids the obstacle detected.

10. A navigation route generation device comprising:
a controller configured to acquire a travel direction of a host moving body, generate a parallel route, which is a route parallel to the travel direction, set the parallel route as a navigation route of the host moving body, and issue a command to return from the parallel route to a route on a line in the direction of travel prior to the generation of the parallel route.

11. The navigation route generation device according to claim 1, wherein
the controller is further configured to set a route transition parameter, including one or more of a transition route, speed during transition, transition duration, and steering angle, up until the host moving body reaches the parallel route from the position of the host moving body.

12. A navigation route generation device comprising:
a controller configured to acquire a travel direction of a host moving body, generate a parallel route, which is a route parallel to the travel direction, set the parallel route as a navigation route of the host moving body, display the parallel route, display on a display a graph indicating a current travel direction of the host moving body, move the graph displayed on the display parallel, and generate the parallel route on the moved graph or on an extension line of the graph.

13. The navigation route generation device according to claim 12, further comprising
a touch panel configured to sense touch operation,
wherein the controller is configured to move the graph parallel according to the touch operation.

14. The navigation route generation device according to claim 12, further comprising
a dial-type input component configured to sense an amount of rotation,
wherein the controller is further configured to move the graph parallel according to the amount of rotation.

15. An automatic steering system, comprising:
the navigation route generation device according to claim 1; and
an automatic steering device configured to automatically steer the host moving body,
wherein the automatic steering device is configured to perform steering according to the parallel route generated by the navigation route generation device.

* * * * *